United States Patent [19]

Caballero

[11] 4,130,964
[45] Dec. 26, 1978

[54] APPARATUS AND METHOD FOR GROWING LEGUME SPROUTS

[76] Inventor: Edward A. Caballero, 1216 Spruce Ave., Chico, Calif. 95926

[21] Appl. No.: 787,991

[22] Filed: Apr. 15, 1977

Related U.S. Application Data

[63] Continuation-in-part of Ser. No. 636,818, Dec. 1, 1975, abandoned.

[51] Int. Cl.² ............................................. A01G 31/02
[52] U.S. Cl. ............................................ 47/16; 71/31; 47/58
[58] Field of Search ................ 47/58, 14, 16, 59–61, 47/DIG. 9

[56] References Cited

U.S. PATENT DOCUMENTS

| 2,051,460 | 8/1936  | von Skrbensky | 47/58 |
| 2,736,643 | 2/1956  | Pentler et al. | 47/14 X |
| 2,989,821 | 6/1961  | Blondheim et al. | 47/DIG. 9 |
| 3,643,376 | 2/1972  | Poindexter et al. | 47/61 |
| 3,768,201 | 10/1973 | Yoo | 47/16 |
| 3,911,619 | 10/1975 | Dedolph | 47/14 |
| 3,991,514 | 11/1976 | Finck | 47/16 X |

FOREIGN PATENT DOCUMENTS

| 517930  | 3/1953 | Belgium | 47/14 |
| 1402261 | 8/1975 | United Kingdom | 47/16 |

Primary Examiner—Robert E. Bagwill
Attorney, Agent, or Firm—Mark C. Jacobs

[57] ABSTRACT

A new hydroponically oriented apparatus for the sprouting of legume plants such as alfalfa, green beans, wheat and the like is disclosed. A unique process for sprouting of the legumes from seed, which includes the step of mineralizing the sprouts is also disclosed.

12 Claims, 10 Drawing Figures

APPARATUS AND METHOD FOR GROWING LEGUME SPROUTS

PREVIOUS APPLICATIONS

This application is a continuation in part of my application Ser. No. 636,818 filed Dec. 1, 1975 (now abandoned), and bearing attorney docket number 1047,

BACKGROUND OF THE INVENTION

1. Field of Invention

The invention relates to an apparatus and method for the production of legume sprouts from seed.

2. Description of the Prior Art

Applicant is aware of the following U.S. Patents, none of which pertain to the apparatus or method disclosed herein.

| von Skrbensky | 2,051,460 ; | Stroller | 2,522,409 |
|---|---|---|---|
| Hammerstrom | 2,296,849 : | Martin | 2,928,211 |
| Martin | 3,458,951 ; | Mun | 3,616,560 |
| Poindexter | 3,643,376 ; | Yoo | 3,768,201 |

In brief, the above patents disclose their apparatus and methods for growing plants from seeds. Thus, von Skrbensky discloses a process for raising plants from seeds which comprises treating the seeds at an elevated temperature in the presence of a nutrient material which includes alkali, thiocyanates and iodine salts. Here, the seeds themselves are treated, and later the rootlets of the new plants are treated.

Hammerstrom et al discloses a cabinet for the quick sprouting of soy beans. Note, however, that his chamber does not employ light of any type.

In the Martin U.S. Pat. No. 2,928,211 the trays that are employed are solid trays rather than a screen material for the germination of the seeds. In addition, both the apparatus and the process of feeding the plants differ from those of the applicant.

In Martin U.S. Pat. No. 2,928,211 which relates to the growing of grasses for animal feeding, there is no provision for misting of the plants as is carried out by applicant in his attempt to mimic nature. In this reference, the feeding of the plants is from the bottom through the roots.

Mun teaches a unique process which combines the use of both hot and cold water for the growth of bean sprouts. This process does not employ any light source to aid in the growth of the plants.

In Yoo the seeds are not anchored into a growing tray, in any manner, but a free to bounce around as is shown in FIG. 1. Indeed, the process of feeding chelated chemicals is also not to be found in this reference.

Stoller employs a process for sprouting legumes that employs an ester of a phenoxy aliphatic acid. The use of such reagent would be deemed unacceptable to many health food enthusiasts in today's market.

In Poindexter, the process is dissimilar to that of applicant, in that no sunlight or other light device is employed and the feed nutrients differ.

Applicant is also familiar with Ashmead et al U.S. Pat. No. 3,873,296 issued Mar. 25, 1975 which utilizes similar chelated minerals to those of applicant, but for a different purpose in a different process.

Figure 1:
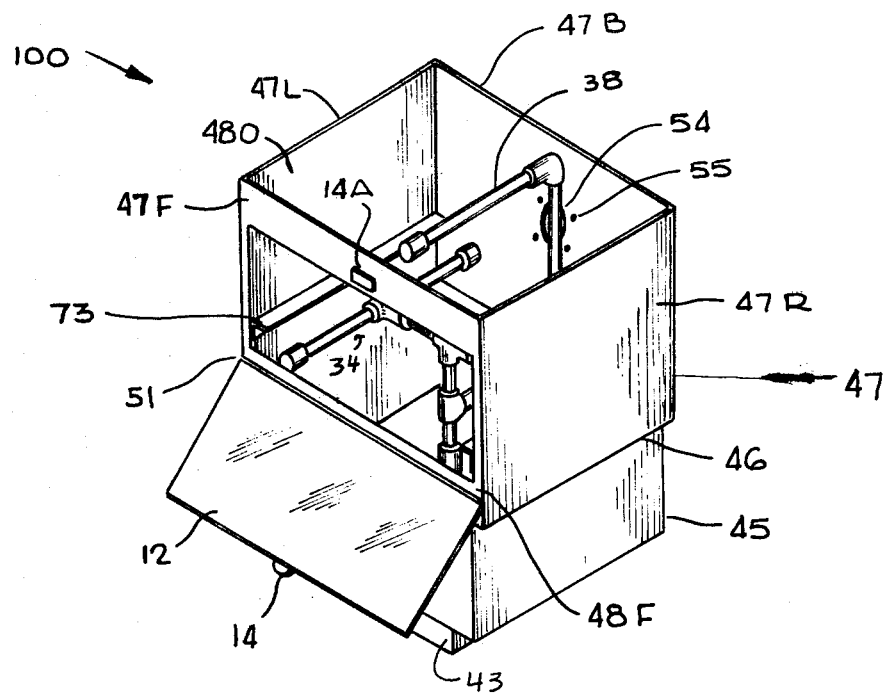
FIG. 1 is a perspective view of one embodiment of this invention, with the top section removed therefrom.

From a review of the prior art, it is seen that no one sprouts legumes involving the use of pseudonatural misting, and no one treats the new sprouts with minerals to increase their nutritionality.

Chelation compounds are coordination compounds wherein a single ligand occupies more than one coordination position. Such ligands are called chelating agents as derived from the Greek meaning crab's claw. A well known chelating compound is ethylene diamine and it forms only covalent bonds. Others such as glycine will form both covalent and ionic bonds in the formation of the chelating agent. Ethylenediamine is called a bidentate compound in that it forms a complex with a metal termed, M. Thus typically beta-diketones form compounds of the formula below with metals.

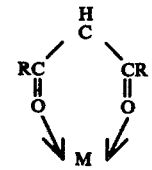

The chelating agents employed herein all employ a metal but are not based upon ethylenediamine. Rather, the ligand is a proteinate.

The compositions utilized herein include any and preferably all of the following metals as elements to be employed in the formation of the complexes; namely calcium, magnesium, sodium, chromium, potassium, copper, zinc, iron, and manganese. All of these are trace minerals which are deemed not only beneficial to the growth of the alfalfa plant from the sprout, but the minerals are also beneficial to man and beast who sup upon the alfalfa. This will be discussed in detail infra.

In order to introduce chelated minerals to the alfalfa plants in a scientific manner, I have invented the sprouting devices which are disclosed in this patent application, and a 2 part process involving the use of such apparatuses.

SUMMARY OF THE INVENTION

This invention relates to the production of sprouted legumes, such as alfalfa, wheat and bean sprouts and is more particularly concerned with a process for feeding the newly germinated seeds with chelated minerals. A new apparatus for carrying out the procedure is also discussed.

Sprouted legumes, the so-called Chinese dishes in America, constitute one of the chief fresh vegetable ingredients in the diet of oriental populations. Since the discovery that the sprouted legumes are rich in vitamins, especially vitamin C, and high in proteins but relatively low in carbohydrates, their use in America has increased considerably.

The increase in natural food enthusiasts and their low price per pound have contributed to the increased consumption of sprouted legumes. Many different legumes may be used for sprouting, such as different varieties of the following: the mung bean, soybean, cowpeas, garbanzo, tapilan, cadios (*Cajanus cajan Springl.*), and the winged bean (*Psophocarpus tetragonolabus L.*) and alfalfa, which is often used in salads and sandwiches. The three legumes most commonly eaten as sprouts are different varieties of the soybean, the mung bean and the alfalfa.

It is seen that while the disclosure will relate primarily to alfalfa, the apparatus and the process of this invention find equal applicability in the production of other legume sprouts. Thus, hereinafter where appropriate, discussion that relates to alfalfa will in fact relate to legumes in general.

The discussion will first relate to the germination device, and the process for germination, followed by the mineral treatment process.

Accordingly it is an object of this invention to provide a a new apparatus for the germination of legume seeds.

It is another object of this invention to provide an apparatus wherein germination will take place quickly, and easily.

Another object is to provide an apparatus that can be readily assembled and taken apart for storage by the homeowner.

A further object is to provide an apparatus that is able to employ recycled water, an important consideration in these days of limited water availability.

A yet further object is to provide a process for the germination of legumes of high mineral content.

Still another object is to provide a process for the germination of legumes in less than about half the time of previous processes.

One other object is to provide a process of building up a mineral residual in the seeds obtained from the sprouting of the original seeds in accordance with the instant process.

other objects will in part be obvious and others will be readily discernible from a reading of the following specification.

It should be understood that in the several embodiments set forth herein, that like numbers refer to like parts.

For a fuller understanding of the several aspects of the instant invention, reference should be had to the following detailed description.

DESCRIPTION OF THE PREFERRED EMBODIMENT

Figure 7:
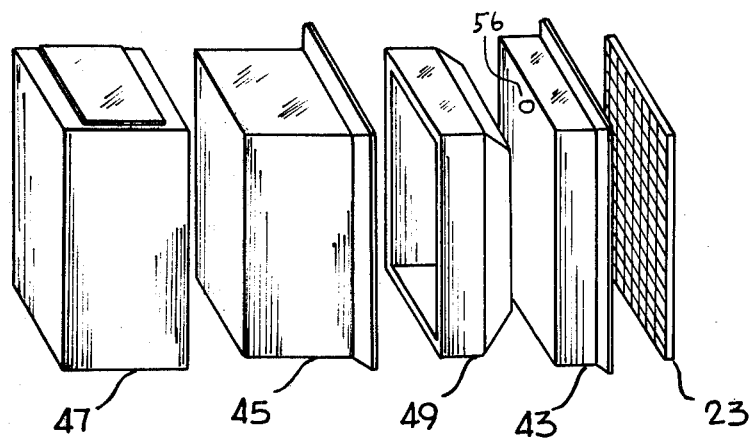
FIG. 7 is an exploded perspective view showing how the parts of the embodiment of FIG. 1 nest within each other for storage.

The apparatus of this invention is one intended for the sprouting of legumes from seeds. It consists basically of 5 main nesting parts, and as such is highly portable, as well as being capable of easy storage in the household when not in use. These five components are best seen in FIG. 7. While not illustrated in order of assembly, they are shown in the proper order for storage. The key parts are chamber 47; tank 45; top 49 and base 43, with the growth screen being denoted as 23.

FIG. 1 is a perspective view of one embodiment of this invention. Cabinet 100 is a rectangular or square unit, though other shapes could be employed at higher manufacturing cost. The four components other than the screen 23 can be metal, such as stainless steel, or aluminum alloy to resist water pitting, plastic such as ABS or even wood if properly treated to resist moisture, or any combination of same. Tank 45 is seen to be removably mounted on base 43. Tank 45 is seen to have 4 upstanding walls, the junctions of which have been sealed to prevent water leakage therefrom. The top, not bottom of 45 is open. Lip 46 extends outwardly around the periphery of tank 45 and then upwardly to form a rest surface for chamber 47. The bottom of tank 45 rests upon the top surface of base 43. As is seen from FIG. 7, base 43 is generally rectangular with a flat top surface having an opening 56 therein, which opening is in communication with hole 52 in the bottom of tank 45. The bottom wall of 45 is seen to be fit water-tight to the sidewalls.

Chamber 47 is mounted removeably within the lip 46 of tank 45. Chamber 47 has 3 solid walls, 47 L,B and R as is seen in FIG. 1. The front wall consists of a rectangular frame 48F, having an opening, preferably rectangular 48-0. Door 12 is hingedly connected at the bottom of the frame 48F by hinge 51. Screen 23, to be described in more detail infra is seen set into chamber 47, and mounted therein removably on 4 L brackets 73 which are permanently secured to the inside opposite sidewalls of 47 in the same horizontal plane. Chamber 47 of this embodiment is sized large enough to accommodate two trays 23, and as such a second pair of brackets 73 can be mounted on the inside walls of 47.

Door 12 is secured in closed position by combination latch-handle 14 which engages closure mechanism 14a on the top outside portion of frame 48F. Though not shown in the figure, whether-stripping or some other seal may be employed to achieve a perfectly tight waterproof fit of door 12 to the frame 48F.

Figure 2:
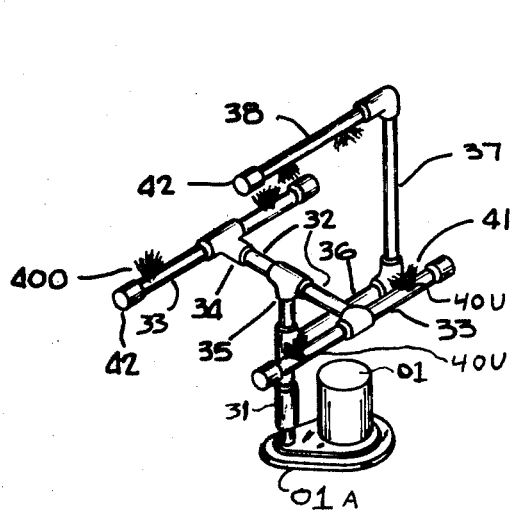
FIG. 2 is a perspective view of the pump and misting system employed in the embodiment of FIG. 1.

Shown also is the fan mount opening 54 and mounting holes for said fan.55., in the rear wall of 47,47B. Fan 53 not shown in this Figure is seen in FIG. 4, mounted upon the wall. Two portions of U-pipe 39 are seen in this Figure, namely horizontal pipe 38 and vertical pipe 37 connected thereto. The balance of the mechanism for sprouting the legume seed including the spray system of FIG. 2, and the top 49 and its appurtentant hardware as shown in FIG. 3 have been omitted from this Figure.

Figure 3:
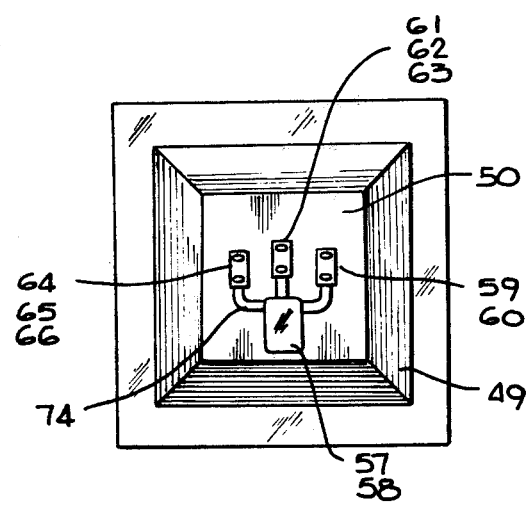
FIG. 3 is a top plan view of the apparatus of FIG. 1, including the top section.
Figure 4:
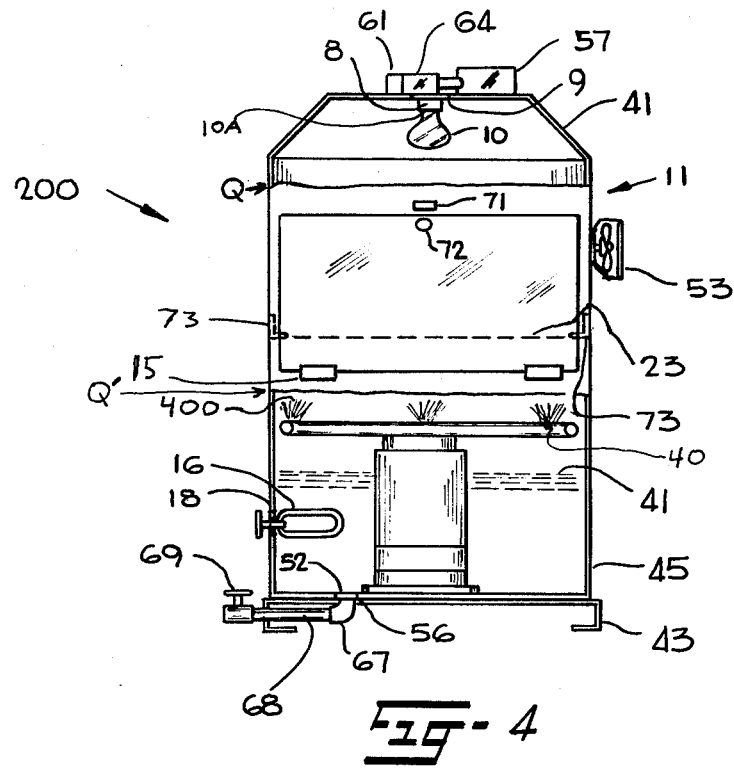
FIG. 4 is a partial side view-partial sectional view of another embodiment of this invention.

Turning now to FIG. 3, it is seen that top 49 is a generally rectangular semi-domed shape member having a central flat area 50. Shown mounted securely on this flat area 50 are timer housing 57, containing electric timer 58, not shown in this Figure, which is electrically connected via the conduits 74 to a switch box 61 and to two outlet housings 59 and 64. Housing 59 has fixedly mounted therein two oconventional 110 V. electrical outlets, 60. Housing 64 has two electrical sockets 65 & 66 therein, intended for plugs from the motor and from the heater, both of which will be described in detail later, the sockets being denoted as 66 and 65 respectively. Switches 62, 63 in housing 61 are electrically connected to timer 58. Light switch 62 and timer on-off switch 63 are conventional toggle switches. Since the view of FIG. 3 is a top view, aperture 9 in central area 50 is not seen in said FIG. 3. From FIG. 4, lamp housing 8 can be seen to be physically connected to timer housing 57 via said aperture 9. Lamp housing 8 is a threaded metal tube that is threadingly engaged to a suitable threaded aperture in the base of timer housing 57. Lamp socket 10A conventionally secured in housing 8 is electrically connected to the timer 58. Threadingly secured in socket 10A is an ultraviolet lamp also known as a sunlamp, 10. Such lamps are offered in the marketplace by such companies as General Electric and Sylvania.

FIG. 4 is a combined view of a slightly different embodiment of the invention of FIG. 1. In this embodiment, the fan 53 is seen to be mounted on wall 47R, rather than in the rear as in the FIG. 1 unit. Tray 23 is also located in chamber 47 at a position relatively lower than the opening of door 12. The door's bottom hinges, here 15, being conventional hinges rather than the piano hinge 51 as in FIG. 1, are above the tray when measured upward from the base. The balance of cabinet, including the base 43 and tank 45 are the same as employed in the FIG. 1 embodiment.

In this combined view, the portion above the cutaway line Q' and below the cutaway line Q is a vertical front view of embodiment 200, whereas the portion above cutaway line Q is the same minus sheet metal and that portion below the line Q' is also a front panel absent in one view. Thus lamp 10 is capable of being seen in this view. Also tray 23 can be seen for the same reason.

Turning briefly to the hardware found in the embodiment of FIG. 4. Shown resting in place on the bottom wall of tank 45 is water delivery system 75. This unit is best understood by reference to FIG. 2. Immersible sump pump 01 fixedly secured to its base 1A has a riser 31 in fluid engagement with an outlet at the lower portion of the pump, 01. Typical of such pumps that can be employed are those manufactured by Peabody-Barnes, such as its SS31. Such pumps are outfitted with from a $\frac{1}{8}$ to $\frac{1}{4}$ horsepower motor. The riser, and all piping conncted thereto may be made of Schedule 40 PVC or iron treated for rust prevention, such as is employed in home garden sprinkler piping arrays. Riser 31 is positioned in substantially a vertical orientation, and is connected at its lower end as indicated previously, and at its upper end to a T connector of suitable size, at the base end of said connector, 35. Two T-shaped pipe sections 34 are joined at their bases to said T connector 32 to form an H shaped structure, 33. A portion of one of these T shaped units 34 can be seen in FIG. 1. The terminals of each leg of the H shaped structure 33 are closed by suitable plugs 42. Plugs 42 may be threadingly engaged, or adhesed in place or both, as is known to the art. Both T shape sections 34 are oriented to be in the same horizontly positioned plane. If not, difficulty may behad if water is to be pumped angularly, in that the water 41 will be unequally distributed from the foggers 40-U. These foggers 40-U are threadingly engaged to the structure 33 at suitable locations thereupon, via self-tapping apertures in said structure 33. While shown positioned on the outside side of the H, 33, it is within the scope of the invention to have the foggers 40 positioned also on the inside of the H 33, as well as a combination of in and out positioned foggers.

Interposed at a suitable location near the upper end of riser 31, on the side of 31 facing the pump 01 is U structure 39, composed of segments 36, 37, and 38. Pipe segment 38 is seen to be plugged on its terminal end with a plug 42. This U structure is fixedly secured in fluid communication with the flow of water through 34. It, 39 may be attached to either riser 31 or to H 34. Such a connection is conventional known to art. U 39 is mounted such that both arms 36, 38 are in the same vertical plane, preferably at a 90° angle to horizontal member 32. One or more foggers 40D are mounted in the same manner as those designated 40U along arm 38. While not shown, it is within the scope of the invention to have a water delivery system 75 with foggers positioned upward on arm 36.

Returning now to FIG. 4, there is also shown to be a stated amount of water 41 in the tank 45. This water 41 is recycled onto the plants by the foggers 40, and the excess not taken up by the plants drains downwardly into the body of water 41. Thermostatically controlled heater 16 which is mounted through one of the walls of tank 45 at aperture 18 in said wall. Suitable gasket or waterproofing not shown, but well known to the art must be employed to prevent leakage of water 41 through aperture 18. A typical heater that may be employed is a lower voltage 15 watt heater made by General Electric, among others.

Drain hole 52 in the bottom of tank 45 communicates with elbow 67, which is threadingly engaged thereto to form a water-tight egress from the tank. Elbow 67 is connected at the end not attached to 52, to drain 68, which in turn is mounted through an opening in one upstanding wall of base 43, and which drain 68 has a closure valve 69 in fluid communication therewith mounted at its opposite end.

Figure 6:
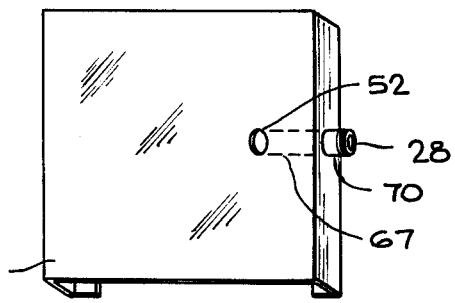
FIG. 6 is a perspective view of the base employed with the instant invention

It is seen that there is no criticality in the location of the fan, except that it should not be preferably on the front wall of chamber 47, and there is no criticality for the location of either the heater of the drain and drain pipe hole 52 in 45 and its corresponding hole 56 in base 43, beneath 52, if the base has a solid top wall as in FIG. 4. If however a lower cost base is employed such as the one shown in FIG. 6, and contemplated for use in the FIG. 1 embodiment, there is no hole 56 as in FIG. 4. In the base embodiment of FIG. 6, the top wall is seen to be only a frame and is designated 76. Here elbow 67 leads directly to hole 52 in tank 45. The threads 28 are for the attachment of drain 68 and valve 69. Optionally in this embodiment, drain pipe 68 can be omitted, with just the valve attached directly to the elbow, while still achieving the same result. Also optional & not shown is a one way entrance valve for $H_2O$ addition to the tank.

Figure 8:
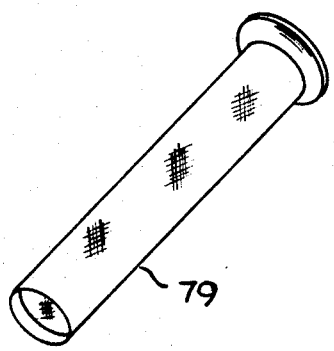
FIG. 8 is a perspective view of a filter to be employed in the apparatus of this invention.

FIG. 8 is seen to be a perspective view of a filter 79 to be employed preferably in riser 31 to to filter out any particulates from the water, to prevent clogging of the foggers 40. Such filters are readily available in any store that sells swimming pool supplies.

Figure 5:
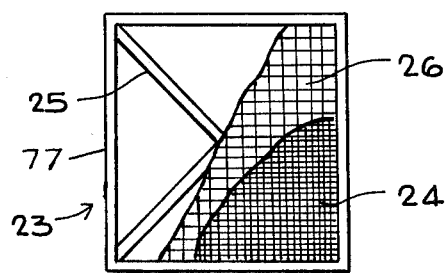
FIG. 5 is a top plan view of the growth screen employed in the apparatuses of this invention.

Turning back to FIG. 5, there is disclosed a growth tray 23, having a generally rectangular frame 77, or generally square, with diagonal cross-bracing 25 and two superposed layers of screening. The lower screen, which is intended for support and stiffness is of $\frac{1}{2}$ inch squares, plus or minus 0.25 inches, and preferably made of galvanized iron. The top screen is of the 12 to 16 squares per inch and may be of metal or plastic. The exact size of the top screen is determined by the size of the seed. Alfalfa will not go through 16 square per inch mesh. These screenings may be secured to the frame 77 in any convention manner used in the manufacture of window screens, such as by splines, nails, or adhesive.

Figure 9:
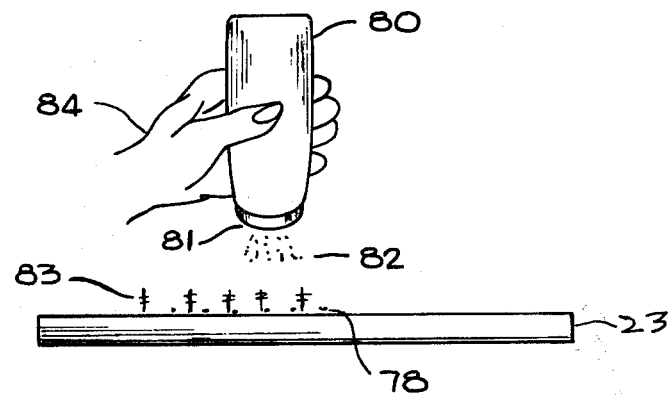
FIG. 9 is a perspective view of a shaking device used optionally in conjunction with the process of this invention.
Figure 10:
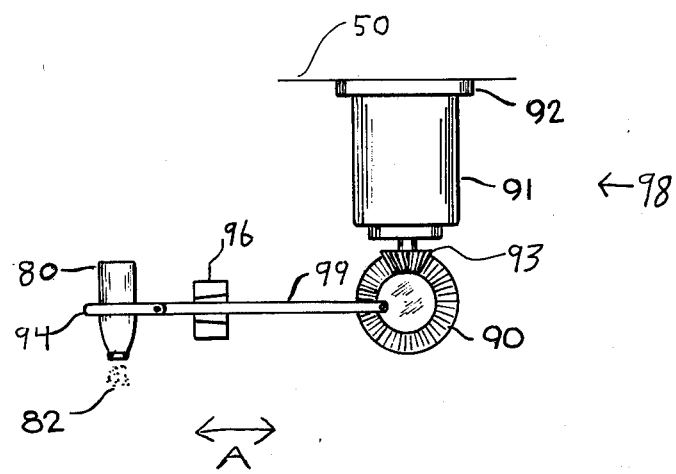
FIG. 10 is a front view of an automatic sprinkling device for use with this invention.

FIG. 10 is a perspective view of a shaking device used in connection with the delivery of the minerals to the plants in accordance with the process to be recited below. Since its use is not mandatory, it is not shown in FIG. 4. The figure 10 does however reveal its mode of mounting in the top portion of this inventive device. FIGS. 9 and 10 are discussed in detail hereinafter.

Though not shown in the drawings, it is within the scope of the invention to provide a water inlet means such as a one way valve of standard dimension, e.g. hose connection from the garden diameter, such that water can be added to the cabinet 100 as needed.

THE PROCESS OF GERMINATION

It is believed that by understanding the apparatus aforesaid, one will be in a better position to follow the instant process, which is to be carried out in said apparatus.

Seeds of legumes, such as any of those mentioned previously among others, are first washed and soaked in a suitable metal or plastic container, such that all seeds are submerged, in plain water at a temperature which is maintained at about 82° F,± 5° for a few hours. Larger legumes such as lima beans may require as much as 3 hours, in order to reach a swelled state. In this enlarged size, the seeds, even the smallest, are capable of being retained as seeds 78, in screening 24, as per FIG. 5. The seeds are scattered in a single layer on one or more trays and placed into a growth chamber such as 100.

Time clock 58 is then adjusted for the desired control of the foggers on time. During the sprouting cycle, the foggers 40 are turned on every 15 minutes for about 45 seconds, such that the seeds 78 receive a fine mist thus emulating nature with what is called a pseudonatural misting action, in that the majority of water to fall upon the seeds and sprouts, later, is from above rather than at what would correspond to earth level.

the foggers are seen to have a # 5 hole for water egress, such that the mist is very fine. In order to ensure that any small particulates in the water do not clog the aperture, filter 79 as shown in FIG. 8 is employed to remove such undesireables, such as flakes of rust. The temperature of the fogging mist at time of pumping is about 90° to 92° F. This temperture is obtained and maintained by use of thermostatic heater 16. Any water not absorbed by the seed, or later the sprout, drips down through screen 23 into tank 45 to become a part of the body of water 41. If the apparatus is outside in very cold weather, the tank water may be heated to as high as 135° F. to maintain the desired mist temperature in the tank. The 45 second mistings at 15 minute intervals take place to the cycle end or harvest, actual duration depending upon the outside temperature surrounding the instant apparatus. If it is being used on a back porch rather than indoors a longer time is needed. When the environment temperature is about 40° F. and under, it is necessary to mist for the full 32+ hours and perhaps a bit longer for large seed legumes.

At the commencement of the sprouting cycle, the light(s) are turned on in the chamber. Lamp 10 is a standard 150 watt UV or sun lamp. In a small machine I will have one lamp, and a larger, two or more. Preferably the maximum distance from plants to lamp is 14 inches. Care must be taken however not to have the sprouts too close to the lamp, eg. under 14 inches in order to prevent the seedings from being burned and dehydrated by the heat generated from the lamps. The fact that seeds are on a lower tray 23, ie. beneath the primary tray 23, in no way interferes with the operation of this process. One might however, want to take the following step to ensure proper germination as desired of the lower tray: to have the lamp on in the last six hours of the germination cycle.

Since the light is maintained at all times during the sprouting cycle, it is seen that what in fact takes place is a "sun shower", during the misting step that reoccurs periodically.

Subsequently after each misting or fogging cycle, the seeds and later the sprouts are mineralized. This term is defined as having a chelate(s) of metals, which ones are to be recited below, sprinkled onto the young sprouts and prior thereto on the unsprouted seeds, manually or automatically from above. The intervening time when no solution is added to the sprouting plants varies with each sprout variety.

A desired quantity of seed is placed in the cabinet 47 on the screen 24. These seeds have been previously soaked in lukewarm water for a time period as mentioned previously. The door 12 is closed. The timer 58 is now turned on such periodically as mentioned. Heated water at the proper temperature is sprayed from the nozzles 40. This intermittent spraying is continued until the sprouts have grown to about three and one half to four inches for Mung beans and one to one and one half inches for alfalfa. The optional mineralization step is then carried out as aforesaid. The sprouts can now be removed from the device.

The harvested fresh crisp sprouts when removed from the tray 23 can be soaked in cold water. An agitation of the sprouts will cause the hulls to separate and the sprouts are now ready to be served. The sprout growing apparatus 100 and the screen 23 are thoroughly washed and the machine is ready to grow another batch of sprouts. Washing is especially recommended if the mineralization step has been carried out.

When the process of mineralization is to be carried out manually, door 12 is opened, and a smaller shaker top container is held by hand in the chamber 47 momentarily with the top held downwardly as per FIG. 9, wherein bottle 80 is shown with shaker top 81 thereon and several fluid drops of minerals 82 are shown about to impinge upon a plant 83. The sprinkling is carried on about 2 to 3 inches from the young plants and unsprouted seeds for preferably about 10 seconds, and no more than about 20 seconds. The fact that the plants will suffer a slight chilling effect if the outside temperature is less than that inside the chamber 47 has not been seen to have an adverse effect on the young plants, especially since the exposure to the atmosphere is only for a few seconds.

Preferably, in the last 4 hours of the growth cycle, I reduce the mineralization to twice per hour, or about every other half hour. This is due to the fact that the plants are now almost ready for harvest as sprouts. And the closer to harvest the lesser the effect the mineralizion will have upon the young sprouts.

In volume, I add about 0.5 pints of chelated minerals for a tray of seeds 36 inches by 36 inches. An excellent mineralizer is a common household salt cellar with a plurality of holes. A tray of seed 24" × 24" uses ⅔rd of 0.5 pints of chelated minerals for the mineralization. The nature of the solution of chelated minerals will be discussed infra.

It is seen that the fogging takes place every 14+ minutes only for about the first 22 to 24 hours of the process, and that the mineralization step takes place at the end of 24 hours and continues until harvest time, generally about 30 to 32+ hours. With this process, alfalfa sprouts are ready for harvest after about 32 hours, depending on the season. A sure sign is when the tops of the sprout take on a change of color from light green with parts of yellow to a solid dark green. That period is when the green or chlorophyll is chelated to magnesium.

This feeding of a preferably aqueous solution of chelated minerals, (mineralization), can be done manually or automatically.

Turning now to a discussion of the mineralization step to be carried out automatically. Reference should be had to FIG. 10. Here, vertically mounted small motor, 0.05 hp. motor is secured to the underside of 50 via suitable mounting bracket 92 and appropriate screws or bolts, not shown. Such motor 91 must be waterproof and unaffected by the chelated minerals in the atmosphere of the environment. Gear 93 is mounted on the motor shaft, # not shown, and this in turn engages eccentric 90 in a conventional manner for such hookups. Arm 99 is rotatably mounted on one end to the eccentric and on its opposite end to jaw 94. Bottle 80 shaker top 81 and drops 82 are the same as in the manual version. Jaw 94 is spring loaded to tightly engage bottle 80. Jaw 94 is secured to arm 99 which is held in limiter 96, and 96 being mounted in chamber whereby arm 99 is permitted to swing to and fro with a stated path. Deflection limiter 96 is mounted at right angles with the vertical axis to 94 in 47 and said arm 99 sways within the confines of slot-limiter 96. It is understood that the shaker system 98 shown in this figure is skeletal only, in that only the essential operating parts to achieve the desired reciprocating motion is depicted.

Motor 91 is connected electrically to timer 58 such that it goes on at the times desired for the operation of the reciprocal motion of 94, as is necessary for the mineralization step.

When the mineralization is carried on mechanically, the size of the bottle and the timing of the cycle are maintained uniformly, but are the same as when carried out manually.

Since the mineralization does not commence till after each fogging, it is seen that there is an interspersed period of just "sunshine" with no liquid addition.

Since sprouting can occur without impingement of a chelated mineral solution, it is seen that the step is not required for the actual sprouting. However when omitted, the plants at the end of the time required prior to harvest if treated with minerals, are about half the size as the treated ones, though ready for harvest.

The total sprouting to harvest time varies from variety to variety of legume. For alfalfa, the total time is about 32 hours, with the lights on 32; misting the first 22–24 which goes on for 4 to 6 hours, followed by a mineralization period of 4 hours. Arrow A indicates directionality of bottle movement. It has been found that the growth cycle for harvest from seed for alfalfa is 32+ hours, of which the first 24 hours require misting and this is followed with an additional moisture in the mineralization.

It has also been found that for alfalfa the lack of fresh air or oxygen causes the sprouting time to be lengthened and the growth to be dwarfed. The fan not only stimulates the sprouts with the necessary oxygen, but also exercises the plant to strengthen its fibers.

By contrast, alfalfa planted in the ground takes about 3 weeks to reach sprout harvesting status.

It is seen in review, that the fine mist of foggers 40 wets and condenses on the single layer of seeds and on the young sprouts and forms into droplets, which if not absorbed fall down either onto a second tray 23 of further seeds 78 if present or into the residual water 41. As the sprouts grow, the mist condenses on the the constantly growing upper portion of the individual sprouts.

The optional mineralization step works in the same general manner, except that the apertures of the bottle shaker 81 are generally larger than the fogger openings such that larger drops and not a fog are impinging on the seeds and sprouts.

It is quite obvious, that upon completion of the use of the inventive device, excess fluid 41 is disposed of via drain 68 actuated by valve 69. Subsequent to draining, the device is readily disassembled. Testing has indicated that it is important for the minerals to be given to the sprouts in the manner recited, in that attempts to feed minerals through early formed roots only caused the sprouts to die. Thus impingement must be on the stems and leaves primarily.

I have found that one (1) pound of alfalfa seeds germinated in accordance with my process will yield about 12 pounds of alfalfa sprouts in from 28 to 36 hours depending upon temperature of both the surroundings and the mist employed herein. Mung beans can be germinated to harvestable sprouts in about 32–36 hours.

As is known, legumes represent a whole host of seeds, big and little, with shell hardnesses that differ. Thus I have found that as indicated before, the seed should be soaked in water that is 82° plus or minus 5° for a period of time to induce swelling. Typically I have found that the following require soak times of:

| | | |
|---|---|---|
| 1. | Lentils | 4 hours** |
| 2. | Soy Beans | 6 hours** |
| 3. | Garbanzo beans | 8 hours** |
| 4. | Alfalfa | 2 hours. |

The above times for legumes 1,2, and 3 were found to occur only when I added a small amount of potassium nitrate to the water. Thus for lentils I added 1 teaspoon per pint of water.

Soybeans — added 2 teaspoons per pint of water

Garbanzos — added 2 teaspoons per pint of water

If the $KNO_3$ is not added, the soaking times are 8,24 and 16 hours respectively for these legumes until swelling takes place.

Each of these last 3 legumes were found to require between 3 and 5 hours longer to reach a 2 inch sprout size than alfalfa when processed according to the techniques aforesaid. Similar swell time reductions are available when $KNO_3$ is added to the soaking solution of other legumes.

THE MINERALS ADDED

The minerals fed to the young sprouts and residual seeds in this process are chelated metals. EDTA, ethylene diamine tetraacetic acid shouldn't be employed as the chelating agent, I prefer to use soy proteinate, which is sold by Albion Laboratories, Ogden, Ut. because it is assimilateable by the plants. EDTA, is nonselective as to metals & hard to assimilate.

Other chelating agents that I employ with equally good results include: yeast protein, and derived amino acids and bloodmeal, alone or incombination with soy or milk protein.

The metals that I feed in chelated form to my sprouts are calcium, magnesium, sodium, potassium, copper, zinc, iron manganese and chromium. In analyses of some of my mature sprouts, lead has been found, but this has been absorbed from the leaded gas used in our cars and is not deliberately added. Of the metals that are multivalent, they should always be employed in the plus 2 valence state, e.g. ferrous.

It is interesting to note that the content of lead in alfalfa before mineralization was 5.0 ppm. and after the addition of minerals it showed a drop to 4.0 ppm. which is very encouraging.

The reasons that I employ proteins as my chelating agents rather than some other reagents are based upon the nature of the protein molecules and the properties thereof. Thus, if desired, the reaction of proteins can be controlled, since they are amphoteric. Depending upon the pH and the ion concentration of the system, they may be either positively or negatively charged. Proteins also have the capacity to bind ions. The extent of binding is a function of the particular protein, the pH of the system, and of course, the size, charge and concentration of the ions in question. Further details about the nature of protein molecules can be found in chapter 36 of ORGANIC CHEMISTRY by Morrison and Boyd, 3rd edition, 1974, and the role of proteins in the human body in FOOD THEORY AND APPLICATIONS, Paul and Palmer; published by John Wiley and Sons, Inc. at page 120 et seq. Fundamental information on metalloproteins can be found at page 1530 of the Van Nostrand Encyclopedia of Science, 5th Edition. This text also discloses fundamental information on chelates and chelation, the section on which is incorporated herein by reference.

It is to be seen that the mineralization of the instant process not only leads to quicker harvesting time for the legume sprouts, and that the minerals are thus made available for human nutrition, since they are found in the sprouts in a form that can be assimilated by the human body, but an added benefit is deriveable from the mineralization. When sprouts grown preferably by the instant process, including the mineralization step are allowed to mature and in turn go to seed, there is a higher crop of seeds produced from plants grown according to my process. Thus it was found that alfalfa grown according to known techniques that did not include mineralization produced about 600 seeds per plant. Alfalfa grown according to this invention with mineralization produced about 8500 seeds per plant. Similar results were obtained for other legumes, transplanted into dirt to mature and go to seed as well.

From a commercial point of view, from about 2 oz. of alfalfa seed I can obtain about 1150 sq. inches of young sprouts. When two samples of similar seeds of alfalfa were processed according to the instant invention, (A) including the mineralization step, and (B) without the mineralization step; then planted according to generally accepted principles for growing alfalfa, it was found that lot (A) was ready to use as seed in a period of 3 to 5 months whereas lot (B) had gone to seed in 2 months. A third lot (C) not sprouted in the instant apparatus were found to take about 6 months to go to seed.

An interesting observation to which no claim is made is the fact that I grew alfalfa plants, germinated according to my process including mineralization in my device, next to roses which suffered from aphids, yet the alfalfa were aphids-free.

When work was carried out using soybeans for sprouting, it was found that soybeans sprout twice as fast in my device than by conventional sprouting techniques.

In order to verify the mineral content of sprouts grown according to my process, samples of treated sprouts were sent to the Bio-Medical Data, Inc. laboratory in West Chicago, Ill. for analysis. A typical report for alfalfa showed:

EXAMPLE I

|  | WITH MINERALIZATION | | WITHOUT | |
|---|---|---|---|---|
| Calcium | 3270 | PPM | 1950 | PPM |
| Magnesium | 5620 | PPM | 3630 | PPM |
| Sodium | 3200 | PPM | 1509 | PPM |
| Potassium | 19200 | PPM | 2760 | PPM |
| Copper | 20 | PPM | 10 | PPM |
| Zinc | 100 | PPM | 96 | PPM |
| Iron | 85 | PPM | 81 | PPM |
| Manganese | 21 | PPM | 38 | PPM |
| Chromium | 1.3 | PPM | 0.6 | PPM |
| Lead | 4 | PPM** | 5 | PPM |

Since no lead was included in the minerals added, it was concluded that the lead was absorbed from leaded fuel fumes in the atmosphere.

A similar report was obtained for mineral treated mung beans grown with and without mineralization, with results of:

EXAMPLE II

|  | WITHOUT MINERALIZATION | | WITH | |
|---|---|---|---|---|
| Calcium | 645 | PPM | 4050 | PPM |
| Magnesium | 2220 | | 5410 | PPM |
| Sodium | 1400 | | 3070 | |
| Potassium | 3110 | | 16100 | |
| Copper | 10 | | 22 | |
| Zinc | 56 | | 113 | |
| Iron | 50 | | 124 | |
| Manganese | 13 | | 25 | |
| Chromium | 1.2 | | 0.8 | |
| Lead | 1 | PPM | 7 | PPM |

The chelated materials I employ preferably employ a soy protein chelating mineral in conjunction with the metals. For illustrative purposes, I have found that the following composition is conducive to the growth of legumes.

| | |
|---|---|
| Magnesium | 4.5% by wt. |
| Calcium | 4.5% by wt. |
| Zinc | 0.4% by wt. |
| Iron | 0.2% by wt. |
| Manganese | 0.12% by wt. |
| Copper | 0.05% by wt. |
| Cobalt | 0.002% by wt. |

The above minerals were formulated with 30% soy protein, and the balance being inert material. All of the above metals can be varied plus or minus 25% of each in the makeup of the formula.

A second formula was prepared wherein based upon a 100 pounds of product, 51% by weight was a combination of crude soy protein and chelated metals. The protein was about 30% by weight, based on 100%. The balance was bloodmeal, about 40 to 43% and inert material.

In order to determine what is the best chelated metal diet for a particular legume, and then again the exact growth purpose is necessary, one should perform a chemical analysis of the legume. By analyzing the leaves, one can determine what metals are in the plant. Inspection should also be had of the the stem and root system. If the sprout were the most desirous form of the plant, then a young sprout should be analyzed to determine the actual needs of the sprout of the particular plant. If a sprout were found to contain say X amount of Uranium for example, one could increase the uranium content of the plant by feeding chelated uranium. Thus one works backwards to determine the food to be fed.

The preparation of chelated materials is well known to the art. Indeed much has been written for instance in "Chelating Agents and Metal Chelates" by Dwyer and Miller, Academic Press New York and London, 1964 among others. Reference should also be had to a new patent of Albion Laboratories issued April 26th, 1977 bearing U.S. Pat. No. 4,020,158.

In brief the process of making the proteinate, chelant is prepared as follows. A protein such as protein meal is subjected to acid hydrolysis. The acid splits off the amino acids and small peptides. Then one adds the desired metals to be chelated, usually in the form of oxides, sulfates, chlorides or carbonates. After adjustment of the pH and drawing off of the acid medium that may be present, one ends up with a chelated protein, which is usually of a pH of about 7, i.e. neutral. Usually the end product is air dried to remove moisture to yield a dry product. This dry product may be re-mixed in a water solution and added to the plants in accordance with the techniques heretofore described.

The question may be asked as to why one would bother to prepare a metal chelate, rather than a feed of the original sulfates, chlorides, oxides etc. of any and all of the mentioned metals. The answer is acceptability of that form of the metal by the particular plant being fed. It has been established that certain plants may accept and metabolize certain metals, only if the metal is in an acceptable form. That is, the plus charge(s) have been removed and the metal is neutralized as by being tied up with a protein in an essentially neutral product. The neutral form of many metals can pass easier through the root wall and other parts of the plant for faster metabolization than can the charged version from a dry or liquid standard plant food. Sometimes only chelated metals are absorbed, and non-chelated metals are not.

Thus if a plant wants iron, it may not want it in the form of Iron chloride which is polar and charged.

I believe, but cannot prove, that my increased yields in the seed crops of the legumes I have treated is based upon the nutrition available to the plants not only at a young age, but also during growth. Thus an extremely healthy plant will yield a super crop of seed.

It is to be seen therefore, that my work relates broadly to the care and feeding and breeding of legumes. The formula set forth above has been found to be beneficial to the growth and development of legumes. However, one or more of the list of components could be omitted.

Further information on the manufacture of metal proteinates can be found in U.S. Pat. No. 3,969,540 issued to Jensen, July 13, 1976 which is incorporated herein by reference.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. The method of growing legume sprouts which comprises:
    a. providing a bed of seeds within a confined area of a growth chamber;
    b. periodically introducing into said chamber a fine mist or fog of water above the seed bed, for a predetermined amount of time;
    c. providing UV light in said growth chamber from the commencement of the germination cycle until the sprouts that germinate from seed are ready for harvest,
    further including feeding the sprouts and seeds chelated minerals at least after each mist introduction has ceased wherein the feeding comprises impinging a solution of chelated minerals primarily upon the stems and leaves of the sprouts.

2. The method of claim 1, further including the pre-soaking of the seeds in water to soften the seed, prior to providing a bed of seeds in the growth chamber.

3. The method of claim 2 wherein the seeds are soaked in water maintained at a temperature of 82° ± 5° F. for about two hours.

4. The method of claim 1 wherein the misting step is carried on at 15 minute intervals approximately, for about 45 seconds, per interval.

5. The method of claim 4 wherein the temperature of the mist is about 90° to 92° F.

6. The method of claim 4 wherein the total misting period for the intervals is about 28 to about 32 hours.

7. The method of claim 1 wherein mist water not absorbed by the seeds or sprouts in each misting step is allowed to collect for recycling and reuse during the next misting step.

8. The method of claim 1 including removing excess water not absorbed by the seeds or sprouts for reheating and recycling, the temperature of the water being applied during the misting steps being within the range of 90° to 92° F.

9. The method of claim 1, wherein the bed of seeds is provided one seed high over the bed.

10. The method of claim 1, wherein the feeding of chelated minerals is continued periodically after the mist introduction has terminated.

11. The method of claim 1 wherein the chelated minerals comprise a metal chelated with protein or amino acid and at least one metal selected from the group consisting of Ca, Mg, Na, K, Cu, Zn, Fe, Mn, Cr and combinations thereof.

12. The method of growing superior alfalfa sprouts which comprises:
    a. providing a bed of washed and presoaked alfalfa seeds in a single seed thick layer within a confined area of a growth chamber,
    b. periodically introducing a mist or fog or water above the seed bed for a predetermined amount of time,
    c. providing UV light in said growth chamber for the duration of the germination in the germination cycle,
    d. feeding the alfalfa seeds and sprouts chelated minerals at least after each mist introduction has ceased, wherein the feeding comprises impinging a solution of chelated minerals primarily upon the stems and leaves of the sprouts of alfalfa.

* * * * *